United States Patent [19]

Fuderer

[11] Patent Number: 4,822,521
[45] Date of Patent: Apr. 18, 1989

[54] INTEGRATED PROCESS AND APPARATUS FOR THE PRIMARY AND SECONDARY CATALYTIC STEAM REFORMING OF HYDROCARBONS

[75] Inventor: Andrija Fuderer, Antwerp, Belgium
[73] Assignee: UOP, Des Plains, Ill.
[21] Appl. No.: 931,121
[22] Filed: Nov. 17, 1986

Related U.S. Application Data

[62] Division of Ser. No. 502,580, Jun. 9, 1983, Pat. No. 4,650,651.

[51] Int. Cl.$^4$ ................................................ C01B 1/13
[52] U.S. Cl. ..................................... 252/376; 252/373; 423/359; 423/652
[58] Field of Search ................. 252/373, 376; 423/359, 423/652

[56] References Cited

U.S. PATENT DOCUMENTS

| | | | |
|---|---|---|---|
| 2,029,604 | 2/1936 | Bayer et al. | 422/197 |
| 3,262,758 | 7/1966 | James et al. | 252/373 |
| 3,397,962 | 8/1968 | Squires | 423/656 |
| 3,442,613 | 5/1969 | Grotz | 423/354 |
| 4,079,017 | 3/1978 | Crawford et al. | 252/373 |
| 4,264,066 | 8/1979 | Quartulli et al. | 23/212 |
| 4,296,085 | 10/1981 | Banquy | 423/359 |
| 4,337,170 | 6/1982 | Fuderer | 252/373 |
| 4,391,794 | 7/1983 | Skberring | 423/650 |
| 4,479,925 | 10/1984 | Shires et al. | 252/376 |

OTHER PUBLICATIONS

Oil and Gas Journal, Dec. 12, 1977, pp. 81-84, Author-George Friedman.

Primary Examiner—John Doll
Assistant Examiner—Wayne A. Langel
Attorney, Agent, or Firm—Morris N. Reinisch

[57] ABSTRACT

Integrated primary-secondary reforming operations are carried out with the partly reformed product effluent from the reformer tubes of the primary reforming zone passing to a catalyst-free reaction space at the feed end of a catalyst bed in the secondary reforming zone. The exothermic heat of reaction generated in said reaction space supplies the necessary heat for the endothermic reforming reaction that occurs in the catalyst bed of the secondary reforming zone, and the still hot secondary product effluent leaving the secondary reforming zone is passed in the shell side of the primary reformer zone to supply the endothermic heat of reaction required in said primary reforming zone. Essentially autothermal operating conditions are thereby achieved so as to essentially eliminate the necessity for employing an external fuel-fired primary reformer and/or for consuming a portion of the hyrocarbon feed material for fuel purposes.

20 Claims, 1 Drawing Sheet

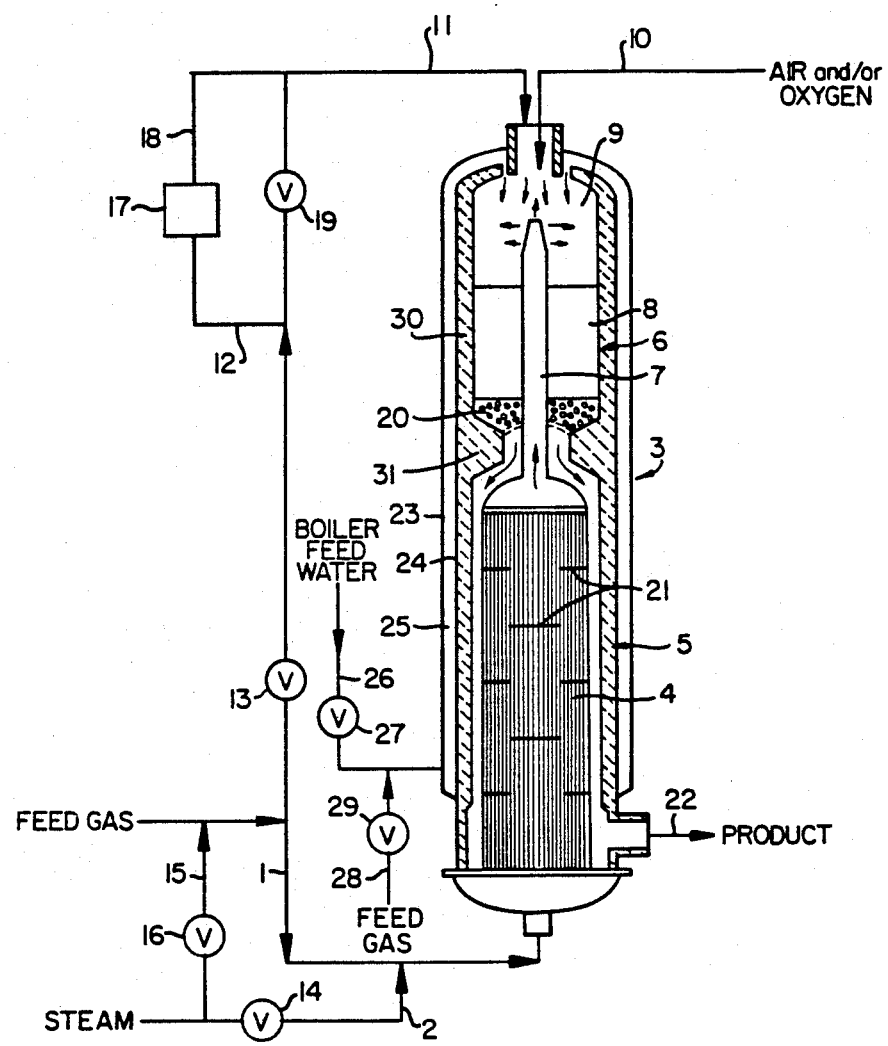

INTEGRATED PROCESS AND APPARATUS FOR THE PRIMARY AND SECONDARY CATALYTIC STEAM REFORMING OF HYDROCARBONS

This application is a Division of prior U.S. application: Ser. No. 502,580, filing date June 9, 1983, U.S. Pat. No. 4,650,651.

BACKGROUND OF THE INVENTION

1. Field of the Invention

The invention relates to the steam reforming of fluid hydrocarbons. More particularly, it relates to an improved process and apparatus for reducing the fuel consumption of such steam reforming operations.

2. Description of the Prior Art

In the primary steam reforming of fluid hydrocarbons, such as natural gas, the feed material and steam are passed through catalyst-containing vertically hanging reformer tubes maintained at an elevated temperature by radiant heat transfer and/or by contact with combustion gases in the furnace portion of the tubular reactor. The hot reformer tube effluent may be passed to a waste heat recovery zone for the generation of steam that can be used in the steam reforming operations. Conventional primary steam reforming operations are commonly carried out at temperatures of from about 750° C. to about 850° C. or above, with a mole ratio of steam to hydrocarbon feed of about 2/1–4/1.

The primary steam reforming reaction is a highly endothermic reaction, and the large amounts of required heat are typically provided by combusting external fuel at close to atmospheric presures in the reforming furnace. The walls of the reformer tubes must necessarily be capable of withstanding extreme operating conditions, such as skin temperatures on the order of 750°–880° C. and pressure differences of about 15–40 bars. Consequently, the reformer tubes are generally made of high alloy, expensive materials having a limited operating life under such extreme conditions. The reaction temperatures existing inside the reformer tubes are generally lower than about 850° C. so that the effluent gas recovered from the primary reformer typically contains 2–6% methane.

In further accordance with conventional practice, the effluent from primary reforming is sometimes passed to a secondary reforming zone in which unconverted methane present in the reformed gas mixture is catalytically reacted with air, oxygen or other suitable oxygen-containing gas. The secondary reforming reaction of methane and oxygen is an exothermic combustion reaction in which the temperature rises generally to above 950° C., with no external heat being supplied as in primary reforming. The walls of the secondary reforming reactor can thus be protected by refractories and kept at much lower temperatures, e.g. 300° C., than is the case with the primary reformer tubes. Instead of such reactor tubes, a single, large diameter secondary reforming reactor can be employed using less costly materials than must be employed in the primary reformer. Because of the very high reaction temperature employed, very little unconverted methane remains in the effluent gas removed from the secondary reformer reactor.

Large quantities of hydrogen, or of an ammonia syngas mixture of hydrogen and nitrogen, are produced either by such steam reforming operations or by partial oxidation reactions. Partial oxidation, like secondary reforming, is an exothermic, autothermal, internal combustion process. While secondary reforming is also a catalytic process, however, the various known partial oxidation processes employ non-catalytic reactions, and thus operate at higher reaction temperatures on the order of about 1300° C. The significant advantages obtainable by use of secondary reforming, or by the use of partial oxidation processing, are off-set to some extent by the need to compress the oxygen-containing gas to the desired reaction pressure or higher. Another disadvantage of secondary reforming and of partial oxidation processing is that part of the feed gas is combusted to carbon dioxide and water instead of to desired product. As a result, more natural gas or other feed gas is required to produce a given amount of hydrogen or synthesis gas, although the autothermic processes do not require any fuel. By contrast, the fuel consumption rate for primary reforming is typically between 30% and 50% of the feed rate.

Those skilled in the art will appreciate that it is not practical to employ secondary reforming processes alone, apart from an initial primary reforming of the feed gas. In practical commercial operations, therefore, primary reforming alone or partial oxidation with oxygen are the most frequently employed processes for the production of pure hydrogen product. When it is desired to produce an ammonia syngas mixture of hydrogen and nitrogen, on the other hand, a combination of primary reforming followed by secondary reforming, with air rather than oxygen, is most commonly employed. While such a combination of primary and secondary reforming is partly autothermic, in that no external fuel requirement exists for the secondary reformer, it nevertheless has the disadvantages of requiring the use of a relatively large primary reformer and of having relatively low thermal efficiency. Such disadvantages have been recognized in the art and efforts have been made to improve the overall process by the recovery of heat in order to reduce the size of the external fuel-fired primary reformer furnace. In the Quartulli et al, U.S. Pat. No. 3,264,066, the problems peculiar to primary-secondary reforming operations for the production of ammonia synthesis gas were addressed, including the requirements for large sized equipment and for the use of large amounts of steam and fuel under desirable operating conditions. Quartulli et al disclose the use of a heat exchanger between the primary and secondary reformers for indirect heat exchange of the primary and secondary reformer effluents. The temperature of the primary reformer effluent, which is the feed to the secondary reformer, is thereby raised, while the temperature of the effluent from the secondary reformer is decreased. In the Crawford et al, U.S. Pat. No. 4,079,017, another approach is suggested wherein parallel steam reformers are used for the primary reforming of a hydrocarbon feed. One portion of the feed is heated by means of radiant heat, i.e. by use of a steam reforming furnace, while another portion is heated by indirect heat exchange with the effluent from the secondary reforming operation, i.e. in an exchanger-reactor unit. While the approach of both of these patents is to recover heat for utilization in the reforming reactions, thus reducing the size of the external fuel-fired primary reformer, either all of the feed, as in U.S. Pat. No. 3,264,066, or at least a major portion thereof, as in U.S. Pat. No. 4,079,017, passes through such a primary reformer. Both patents also have the disadvantage of the typical apparatus problems that are commonly encountered due to the difficult mechanical design problems associated with conventional-type heat exchangers operated at the relatively high temperatures involved in the reforming application.

Another approach to improving steam reforming operations by reduction of fuel consumption is disclosed in the Fuderer, U.S. Pat. No. 4,337,170. This patent teaches the reforming of 20-30% of a feed stream in a primary reformer-exchanger unit in which the hot product effluent from conventional reforming, together with the hot product effluent from the reformer-exchanger itself, supplies the heat for said reformer-exchanger unit. The conventional reforming comprises either conventional primary reforming alone, or such primary reforming coupled with a secondary reforming operation. In the latter case, the hot effluent from the secondary reformer passes to the reformer-exchanger. By contrast with the approach of Crawford et al wherein the product effluent of each of the parallel primary steam reformers is necessarily passed to a secondary reformer with the product effluent therefrom being used to supply the heat required for the primary reforming of a portion of the feed stream, the Fuderer approach does not require the use of a secondary reformer. While the processing flexibility afforded thereby is desirable, the portion of the feed stream that passes directly to the reformer is not subjected to secondary reforming in any event, even when a secondary reformer is used to treat the effluent from a conventional primary reformer. As a result, the residual methane concentration of the mixed product effluent is much higher than that of a product stream from secondary reforming. This loss of unconverted methane is not desirable even though the use of a reformer-exchanger as disclosed by Fuderer enables a significant reduction in fuel consumption to be achieved together with other operating advantages. As with the techniques of Quartulli et al and Crawford et al, it also will be seen that Fuderer requires that an external fuel-fired primary reformer furnace be employed, although the fuel requirements thereof are reduced.

Despite such efforts to improve steam reforming operations, it will be appreciated that there remains a desire in the art to achieve lower steam and fuel requirements and higher thermal efficiencies in such operations. In addition, improved mechanical designs are also desired to reduce the size of the overall reforming systems employed and to achieve other useful purposes, such as a reduction for the thermal stresses to which the primary reformer tubes are subjected. It is also desired to carry out steam reforming operations at higher pressures, as in the range of 20-100 Bar. Such desired improvements also relate to the integration of primary and secondary reforming operations, so as to obtain the benefits of secondary reforming while achieving a more efficient overall reforming operation than has heretofore been possible in the art.

It is an object of the invention, therefore, to provide an improved process and apparatus for the reforming of hydrocarbons.

It is another object of the invention to provide a process and apparatus for minimizing the fuel requirements of reforming operations.

It is another object of the invention to provide a process and apparatus for the integrated primary and secondary reforming of hydrocarbons.

It is another object of the invention to provide a reforming process having low steam requirements and enhanced thermal efficiency.

It is a further object of the invention to provide a primary and secondary reforming apparatus of compact design and of reduced thermal stress of the primary reformer tubes.

It is a further object of the invention to provide a process and apparatus for carrying out steam reforming operations at higher pressures, as in the range of about 20-100 Bar.

With these and other objects in mind, the invention is hereinafter described in detail, the novel features thereof being particularly pointed out in the appended claims.

SUMMARY OF THE INVENTION

The invention results in an integrated primary and secondary reforming process and apparatus utilized in a manner providing for the fully autothermal conversion of hydrocarbons and steam to hydrogen and carbon oxides. The need for an external fuel-fired primary reformer is thereby avoided. The partly reformed effluent from the primary reformer zone of the apparatus passes, in a suitable conduit, through the catalyst bed to the space at the feed end of the secondary reformer zone for which preheated oxygen-containing gas is being introduced. The hot secondary reformer effluent does not leave the apparatus, but passes on the shell side of the primary reformer zone, thereby applying the heat required for the endothermic primary reforming reaction that occurs within the catalyst-containing reactor tubes of said primary reformer zone.

BRIEF DESCRIPTION OF THE DRAWINGS

The invention is hereinafter described with reference to the accompanying drawing illustrating the apparatus and the process flow employed in the practice of the invention.

DETAILED DESCRIPTION OF THE INVENTION

The objects of the invention are accomplished by integrating primary and secondary reformers into a totally autothermal unit that has no essential need for the direct fired primary reformer of conventional primary reforming techniques. The steam requirements for the practice of the invention are very low, and the reforming operations carried out thereby are characterized by exceptionally high thermal efficiencies.

The catalytic conversion of hydrocarbons by reaction with steam at elevated temperature is, of course, well known in the art. A fluid hydrocarbon, such as natural gas, is converted to a hot reformed gas mixture containing principally hydrogen and carbon monoxide in this process according to reaction (1) as follows:

$$CH_4 + H_2O \rightarrow CO + 3H_2 \tag{1}$$

that is generally known as primary reforming and is widely used in the production of synthesis gas or pure hydrogen. This endothermic reaction is carried out in the practice of the invention, as in conventional practice, by passing a gaseous mixture of fluid hydrocarbon and steam through an externally heated reaction tube or group of tubes packed with a suitable catalyst composition, such as solid catalyst granules deposited on an inert carrier material. Whereas the necessary heat is commonly supplied in conventional primary reforming by burning a fluid hydrocarbon fuel, such as a side stream from the fluid hydrocarbon feed stream, with air on the shell side of the primary reformer, the invention utilized the heat content of the secondary reformer effluent for this purpose as is herein disclosed and claimed.

The hot reformer tube effluent of the primary reforming operation is passed, as it often is in conventional practice, to a secondary reformer. Unlike such practice in which the secondary reformer is commonly a separate processing unit, the secondary reformer of the invention comprises a separate processing zone contained within an integrated primary and secondary reforming apparatus. In the practice of the invention and in conventional practice, the secondary reforming operation is carried out to react unconverted methane present in the primary reformer effluent with air or other oxygen-containing gas. As the preheated gases reach the reaction space at the feed end of the secondary reforming catalyst bed in the practice of the invention, the following reactions, with methane as the hydrogen feed gas, are found to occur in this initial portion of the secondary reforming zone:

$$CH_4 + 2O_2 \rightarrow CO_2 + 2H_2O, \quad (2)$$

$$2CH_4 + O_2 \rightarrow 4H_2 + 2CO, \text{ and} \quad (3)$$

$$2H_2 + O_2 \rightarrow 2H_2O \quad (4)$$

Reactions (2), (3) and (4) are exothermic reactions that tend to occur quite rapidly in said reaction space. As the resulting gas mixture passes through the catalyst bed of the secondary reformer zone, the remaining methane is converted by reaction with steam in accordance with reaction (1) above so that very little methane remains in the product gas of the process. The strongly endothermic reaction (1) is a relatively slow reaction that occurs throughout the passage of the gases through the catalyst bed of the secondary reforming zone, thereby cooling the gases from the high temperatures reached upon reactions (2), (3) and (4) occurring at the space at the feed end of said catalyst bed. In the practice of the invention, the proportions of oxygen and of the fluid hydrocarbons feed passed to the integrated primary-secondary reformer are such that the reactions alone are carried out in a manner essentially, or even completely, autothermal in nature, i.e. with essentially no fuel requirement and with an eternal fuel-fired primary steam reformer essentially eliminated as a necessary feature of the overall reforming operation. As is hereinafter discussed, an important feature of the invention is the flexibility of being able to bypass a portion of the hydrocarbon feed stream directly to the hot, catalyst-free reaction space at the feed end of the secondary reforming catalyst bed, as illustrated in the drawing.

With reference to the drawing, a fluid hydrocarbon feed gas stream in line 1, together with steam from line 2, enters the bottom of the integrated primary and secondary steam reformer, designated overall by the numeral 3, for passage upward through the catalyst-filled primary reactor tubes 4 of primary reforming zone 5. Upon discharges from such tubes, the partly reformed primary reformer effluent passes to the secondary reforming zone 6 through conduit 7. As shown in the drawing, conduit 7 extends through secondary reforming catalyst bed 8 to a reaction space 9 in the upper portion of said secondary reforming zone 6 at the feed end of said catalyst bed 8. Preheated air or other oxygen-containing gas is passed to the reaction space 9 through line 10, as is a portion of the hydrocarbon feed and steam through bypass line 11. As the bypass of a portion of the hydrocarbon feed to secondary reforming zone 6 is an optimal feature of the invention. line 11 is shown with control valve 13. Similarly, steam line 2 contains control valve 14 and bypass line 15, with control valve 16, for control of the steam/hydrocarbon feed ration in the portion of the feed passed to primary reforming zone 5 or bypassed directly to secondary reforming zone 6. As is also illustrated in the drawing, it is within the scope of the invention, if so desired in particular processing operations, to pass the portion of the steam/hydrocarbon feed mixture that bypasses primary reforming zone 5 of integrated primary and secondary reformer 3 to conventional primary reformer unit 17 by passage through diversion line 12 containing this unit, and discharge therefrom in line 18 to bypass 11, with control valve 19 being employed in line 11 for this purpose. As will be appreciated from the discussion above, however, the inclusion of such a conventional primary reformer unit 17 in the overall operation of integrated primary and secondary reformer 3 is not an essential requirement of the invention.

In reaction space 9, the preheated oxygen-containing gas will react with hydrocarbons or methane or hydrogen from the by-passed hydrocarbon feed and/or present in the primary reformer effluent so that reactions (2), (3) and (4) occur therein, with the resulting reaction mixture passing downward through secondary reforming catalyst bed 8 shown as being supported by a bed 20 of ball-shaped alumina particles.

The reaction mixture temperature rises rapidly in reaction space 9 due to the exothermic reactions that takes place therein, but are cooled as a result of the slower endothermic reaction of methane conversion with steam that occurs upon passage of the reaction mixture through secondary reforming catalyst bed 8 to the discharge end thereof. The effluent gas from secondary reforming zone 6, which is at a lower elevated temperature than the gas in the reaction space, does not leave the apparatus of the invention at this point, but passes directly to the shell side of primary reforming zone 5. It is further cooled as, it passes from the discharge end to the feed end thereof countercurrently to the passage of the steam/hydrocarbon feed mixture being passed through the catalyst-filled reactor tubes 4 therein. Appropriate baffles, such as those indicated by the numeral 21, can be employed to direct the flow of the secondary reforming effluent gas across said reactor tubes on its passage from the discharge end to the feed end of primary reforming zone 4 prior to exit from integrated reformer 3 at the bottom through line 22 near the bottom feed inlet thereto.

It will be appreciated from the drawing that all of the hotter parts of the apparatus of the invention can be made perfectly concentric, resulting in excellent gas flow distribution and the minimizing of thermal stresses. The apparatus can be constructed with no longitudinal parts having different temperature being rigidly connected to each other.

Consequently, they can freely expand when heated and contract when cooled, thereby also minimizing thermal stresses. Pressure differentials between the shell and the tube sides of the primary reforming zone exist only as a consequence of the pressure drops of the flowing gas streams. Thus, the pressure difference between the shell and the tube side is typically only 3-4 Bar at the cold feed end of primary reforming zone 5, while the tube temperatures are on the order of 440° C. At the upper, discharge end of primary reforming zone 5, on the other hand, the pressure differential is only about 1 Bar, while the local wall temperature is around 800° C. In a conventional primary reformer unit, by contrast, the pressure differential is typically about 30 Bar at a wall temperature of about 800° C. Since the reformer tubes have to withstand only small pressure differences, the total operating pressure can be raised to 100 Bars or even higher.

Integrated primary and secondary reformer 3 preferably comprises an internally insulated cylindrical metal vessel. For this purpose, the inner wall on the shell side of primary reforming zone 5, as well as the inner wall of secondary reforming zone 6, can be lined with MgO or other convenient refractory material so as to protect the outer shell of the reformer and to effectively utilize the available heat of the processing gas streams. It is also within the scope of the invention to employ a double shell construction, together with means for passing steam or a small portion of the hydrocarbon feed gas, or boiler feed water or other coolant through the annular space between the inner and outer shells, desirably at the reactor operating pressure, thereby cooling the inner wall supporting the refractory material. By the use of such construction, neither the inner vessel, nor the outer shell of the reformer reach a high temperature, and both shells can be made of less costly alloys. The outer shell will typically be insulated so that heat losses from the reformer are negligible in customary practice.

The drawing illustrates the use of vertically oriented reformer tubes although it will be appreciated that horizontally oriented tubes can also be employed in the practice of the invention. The use of vertical, hanging tubes is particularly desirable in the reformer of the invention as the hot effluent from the hanging reformer tubes, following steam reforming during the preferable upward passage of the steam/hydrocarbon mixture in the hanging tubes, can conveniently be passed through one or more suitable conduits placed inside the secondary reforming catalyst bed for discharge in the reaction space located near the feed end of the catalyst bed. As is the embodiment of the drawing, the primary reformer effluent can conveniently be passed upward in said conduit means through the secondary reforming catalyst bed, preferably concentrically, to the reaction space above said bed. As disclosed above, the preheated oxygen-containing gas and any bypass portion of the steam/hydrocarbon feed mixture are likewise passed to this reaction space that forms a part of the secondary reformer prior to passage of the reaction mixture through the catalyst bed in the opposite direction, e.g., downward in the illustrated embodiment. As the pressure inside and outside the hanging tubes is essentially the same, tube rupture is avoided without the necessity for incurring undue costs in this regard. In the illustrated embodiment, integrated primary and secondary reformer 3 is shown with an outer shell 23 and an inner shell 24, defining an annular space 25 therebetween, through which boiler feed water or other coolant may be added through line 26 containing valve 27 therein. If desired, a portion of the hydrocarbon feed gas be passed through line 28 containing valve 29 for passage to said annular space 25.

As also shown in the drawing, refractory material 30 is supported on the inside wall of inner shell 24. In a convenient embodiment, an enlarged portion 31 of refractory is provided to extend inward at the juncture between the lower primary reforming zone 5 and the upper secondary reforming zone 6, with said enlarged portion of refractory 31 being used, together with heat resistant material, such as alumina bars or a bed of balls 20, to support catalyst bed 8 of said secondary reforming zone 6.

In the practice of the integrated primary and secondary processes of the invention, the fluid hydrocarbon desulphurised feed gas and steam mixture is introduced to the tube side of the primary reforming zone at a temperature of generally from about 200° C. to about 500° C. The conditions in the primary reforming zone serve to promote conversion of the fluid hydrocarbon feed stream to hydrogen and carbon monoxide. The feed gas-steam mixture in the reformer tubes in thus gradually heated by the countercurrent passage of secondary reformer effluent product gas on the shell side of said primary reforming zone. At the hot discharge end of said primary reforming zone, the temperature of the primary reformer effluent is from about 650° C. to about 900° C. The gas stream, partly reduced in accordance with reaction (1) above, is passed through one or more conduits that pass through the catalyst bed of the secondary reforming zone for discharge into the reaction space at the feed end of the secondary catalyst bed. Air and/or oxygen or another oxygen-containing gas is preheated and passed to said reaction space generally at about 200° C. to 600° C.

The temperature in the reaction space at the feed end of the secondary reforming catalyst bed tends to rise rapidly as a result of exothermic reactions (2), (3) and (4) that occur therein, e.g. above about 930° C. in typical operations. As the gases proceed from said reaction space and pass through the catalyst bed portion of the secondary reforming zone downwardly in the embodiment illustrated in the drawing, however, the gas stream is cooled due to the endothermic reaction (1) wherein remaining methane is converted with steam to form additional amounts of hydrogen and CO. At the discharge end of the catalyst bed, therefore, the gas temperature is typically in the range of from about 900° C. to about 1100° C. As indicated above and shown in the drawing, the secondary reformer effluent remains within the integrated primary and secondary reformer, passing to the shell side of the primary reforming zone where it is cooled by supplying heat for the endothermic reaction (1) occurring in said zone.

The ratio of steam to hydrocarbon feed will vary, as is known in the art, depending upon the overall conditions employed in the reforming zones. The amount of steam employed is influenced by the general requirement of avoiding carbon deposition on the catalyst and by the acceptable amount of methane remaining in the effluent gas under the reforming conditions employed. On this basis, the mole ratio of steam to hydrocarbon feed in the conventional primary reformer units is preferably from about 2/1 to about 4/1. Steam/hydrocarbon ratios in this range are also commonly employed in the primary reforming section of the apparatus of the invention. As indicated above, however, it is possible to bypass a portion of the feed gas directly to the hot catalyst-free reaction space at the feed end of the catalyst bed of the secondary reforming zone, i.e. the reaction space above said bed in the illustrated embodiment. This embodiment enables a very substantial improvement in the steam/hydrocarbon feed gas ratio to be achieved, greatly enforcing the overall performance of the invention. Thus, the steam to hydrocarbon feed ratio in the bypassed gas can be much lower than in the mixture fed to the primary reforming zone, because the bypassed gas is mixed with sufficient oxygen and steam so that no coke or carbon formation occurs on t he catalyst in said secondary reforming zone at the higher temperatures therein. As a result, steam/hydrocarbon mole ratios in the range of from about 0.4 to about 1.4 can often be employed in the bypassed portion of the feed stream. As a substantial portion of the overall feed can be bypassed to the secondary reforming zone in the practice of the invention, exceptionally low overall steam/hydrocarbon feed ratios can be achieved, as between about 1.6 and 2.2 in preferred embodiments of the invention.

It has been determined that, as indicated above, a substantial portion of the overall feed to the integrated primary and secondary reformer of the system can be bypassed to the secondary reforming zone thereof. Thus, from about 50 to about 80 mole % of the total hydrocarbon feed gas stream can advantageously be bypassed to said secondary reforming zone in preferred embodiments, with from about 20% to about 50 mole % passing to the primary reforming space in such embodiments. Those skilled in the art will appreciate that amounts falling outside this range may also be employed within the scope of the invention with the total amount of hydrocarbon feed and oxygen-containing gas added to the system being such that essentially all of the heat required for operation of the primary reforming zone is supplied by the heat content of the secondary reformer effluent in an essentially autothermal primary and secondary reforming operation. Apart from the lower overall steam/hydrocarbon feed ratio achievable in the practice of the invention by the use of the feed bypass feature, it should also be noted that the lesser hydrocarbon feed to the primary reformer zone as a result of said bypass results in a lower pressure drop, or in a higher shell height to diameter ratio than pertains where no bypass is included in the process. It should also be noted that when feed bypass is practiced, the catalyst-free reaction space in the secondary reforming zone functions really as a partial oxidation zone with relatively low oxygen requirements in terms of the overall refining operation. In this regard, the oxygen-containing gas will be understood to pre-mix with the by-passed hydrocarbon feed upon passage from their respective supply lines into said reaction space, with a relatively high oxygen/feed ratio existing at this point. After complete combustion under such conditions, a reaction temperature of about 1300° C. or above would be reached as in a partial oxidation reactor. Before the combustion is fully completed and such high temperature is reached, however, the product effluent from the primary reforming zone passes through the secondary reforming catalyst bed, as through conduit 7 of the drawing, and is discharged into the reaction space to mix with the mixture of oxygen, bypassed feed and the reaction products thereof. As a result, the temperature in the reaction space may rise rapidly to about 1100° C. or some such temperature less than the 1300° C. level that would pertain in a partial oxidation application. As the reaction gas mixture then proceeds to pass through the secondary reforming catalyst bed, the gas mixture is further cooled by the heat requirements of the endothermic methane conversion reaction occurring therein, as indicated above, so that the product effluent exiting from the secondary reforming zone will have a temperature typically on the order of between about 900° C. and 1000° C., although temperatures outside this range may also pertain and be useful for supplying essentially all of the heat required in the primary reforming zone.

The invention is hereinafter further described with reference to a particular illustrative embodiment carried out in the integrated double shell apparatus shown in the drawing. A desulphurised natural gas feed stream, comprising essentially 1,450 kgmol/h methane, is the total feed gas flow to the apparatus. The steam plus water flowrate to the apparatus is 2,770 kgmol/h. A total of 700 kgmol/h of said methane is passed to the primary reforming zone of said apparatus, while an additional 700 kgmol/h of methane are bypassed to the catalyst-free reaction space at the feed end of the catalyst bed in said secondary reforming zone. In addition, 50 kgmol/h of methane are passed through the annular space between the inner and outer shells of said integrated apparatus as coolant fluid. Included in the total amount of steam and water added to the apparatus are 2,070 kgmol/h of steam that are passed to the primary reforming zone, and 640 kgmol/h of steam that are bypassed to said reaction space in the secondary reforming zone. A total of 60 kgmol/h of water is passed through said annular space as coolant fluid. Thus, the overall mole ratio of steam to hydrocarbon feed is 2,770/1,450 or 1.91, for this embodiment of the invention. Rich air is used as the oxygen-containing gas for secondary reforming, with 700+1273 kgmol/h of oxygen+nitrogen being used for this purpose.

The methane feed gas, steam, boiler feed water and rich air were all employed at a pressure of 50 Bar, and the primary reforming effluent, secondary reforming effluent, and product effluent from the integrated apparatus are at pressures of 46, 45.5 and 45.0, respectively. The methane feed gas and rich air are both preheated to 400° C., while the steam is employed at 300° C., with the primary reforming effluent, secondary reforming effluent and product effluent from the apparatus being at temperatures of 750°, 990° and 550° C., respectively. The primary reforming zone comprises 375 tubes, each housing a length of 6.3 m and an inside diameter of 56 mm. The heat exchanger area of the primary reforming zone is 415 m$^2$, with the average temperature difference being 200° C. between the inside and the outside of the tubes. The total heat transferred is 130 G Joule/h (36.3MW). Under such general conditions, the outlet gas obtained in the primary and secondary reforming zones, measured in kgmol/h, is as set forth in the Table below;

TABLE

|  | Primary Reforming Effluent | Secondary Reforming Effluent |
| --- | --- | --- |
| Hydrogen | 1,148 | 3,187 |
| Carbon dioxide | 200 | 434 |
| Carbon monoxide | 116 | 950 |
| Methane | 434 | 66 |
| Nitrogen | — | 1,271 |
| Steam | 1,554 | 2,343 |
| Total | 3,452 | 8,251 |

The pressure drop on the tube-side is 2 Bar, while the shell-side pressure drop is 0.5 Bar. The overall dimensions of the integrated primary and secondary reforming apparatus are 14 m in length, 3.3 m outside diameter and 120 m$^3$ volume. It is estimated that, in a conventional ammonia plant producing the same syngas as in the example above, the external fuel-fired primary reformer of conventional reforming operations has about a 30 times larger volume than that of said integrated reformer apparatus.

The fluid hydrocarbon feed of the invention will be understood to include various normally gaseous hydrocarbons other than natural gas or methane, such as propane and butane, as well as prevaporized normally liquid hydrocarbons, such as hexane or petroleum refining low-boiling fractions such as naphtha. It will be understood by those skilled in the art that the invention can be practiced for the refining of hydrocarbons as part of overall processing techniques for a variety of industrial applications, i.e. as in the production of hydrogen, methanol, ammonia or of (oxo)syngas. When ammonia syngas production is desired, the use of air or oxygen enriched air as the oxygen-containing gas is generally preferred whereas, for example, in the production of hydrogen rather than of a hydrogen-nitrogen mixture, the use of oxygen is more generally preferred for use in the secondary reforming zone of the integrated reformer.

The catalyst employed in the practice of the invention can be any one or more suitable reforming catalysts employed in conventional reforming operations. The metals of Group VIII of the Periodic System having an atomic number not greater than 28 and/or oxides thereof and metals of the lefthand elements of Group VI and/or oxides thereof are known reforming catalysts. Specific examples of reforming catalysts that can be used are nickel, nickel oxide, cobalt oxide, chromia and molybdenum oxide. The catalyst can be employed with promoters and can also have been subject to various special treatments known in the art for enhancing its properties. Promoted nickel oxide catalysts are generally preferred, and the primary reformer tubes are packed with solid catalyst granules, usually comprising such nickel or other catalytic agent deposited on a suitable inert carrier material. The secondary reforming zone commonly contains a bed of such catalyst material in addition to the catalyst-free reaction space at the feed end thereof as discussed above.

It will be appreciated that the steam reforming operations, including those of the present invention, are commonly carried out at superatmospheric pressure. The specific operating pressure employed is influenced by the pressure requirements of the subsequent processing operations in which the reformed gas mixture, comprising CO and hydrogen, or hydrogen itself is to be employed. Although any superatmospheric pressure can be used in practicing the invention, pressures of from about 20 to 60 Bar (about 300 to about 870 psia) are commonly employed, although pressures lower than 20 Bar, and up to as high as 100 Bar (1450 psia) or more can be maintained in particular embodiments of the invention.

The present invention will be appreciated as enabling essentially autothermal reforming operations to be carried out in primary and secondary reforming zones of the integrated reformer unit not requiring the use of an external fuel-fired primary reformer as a necessary part of said unit. Thus, the hydrocarbon feed to the reformer, with all of said feed passing to the primary reforming zone thereof or with a portion, preferably about 50–80% thereof bypassed to the secondary reforming zone, is employed in conjunction with the introduction of sufficient oxygen to the reformer so that essentially all of the heat required for carrying out the endothermic primary steam reforming reaction in the primary reforming zone is supplied by the hot effluent gas exiting from the secondary reforming zone prior to discharge of said effluent gas from the reformer unit form subsequent cooling and purification by conventional means to provide a final product that is either methanol syngas, hydrogen or hydrogen-nitrogen mixtures as in the production of ammonia syngas.

Those skilled in the art will appreciate that the precise amount of oxygen or oxygen-containing gas and the amount of hydrocarbon feed passed to the integrated reformer of the invention will depend upon the particular conditions applicable to any given reforming operation, including the nature of the hydrocarbon feed, the particular catalyst employed, the steam/hydrocarbon ratio employed in the primary reforming zone and in the bypassed steam/hydrocarbon mixture passed to the secondary reforming zone so as to produce sufficient heat so that, despite the endothermic reaction that occurs in the catalyst bed of the secondary reforming zone, the product effluent thereof has sufficient heat to supply the requirements of the primary reforming zone prior to exit with very little, i.e. typically less than 1 mole %, residual hydrocarbon remaining in the product effluent as compared to that present in the effluent from the primary reforming zone. In this regard, it should be noted that the product effluent from the primary reforming zone of the invention will commonly have an unconverted methane content of from about 2–3% up to about 20 mole % on a dry basis as compared with the typical 2–6% residual methane content of the product effluent from conventional fuel-fired primary reforming operations. Such variation in the amount of unconverted methane passed to the secondary reforming zone will be understood to affect the heat requirements of the primary reforming zone and the overall oxygen requirements for a given amount of hydrocarbon feed for the overall purposes of the invention. As was indicated above, it is within the scope of the invention to employ an optional fuel-fired conventional primary reformer for treatment of bypassed feed. In embodiments in which this optional feature is employed, it will be understood that the steam/hydrocarbon feed ratio and the amount of oxygen supplied to the integrated primary-secondary reformer unit will vary from the operable conditions that pertain where no such optional primary reformer on bypassed feed is actually employed. Those skilled in the art will appreciate that various other modifications and variations can be employed in the details of the process and apparatus herein described without departing from the scope of the invention as set forth in the appended claims.

Because of its capability of achieving essentially autothermal operation, with the need for a fuel-fired primary reformer being essentially eliminated, the invention provides a highly desirable and significant advance in the field of reforming of natural gas and other fluid hydrocarbons. Because of its potential for appreciable savings in operating investment costs, the invention is of genuine practical commercial interest, particularly in light of the substantial savings obtainable as a result of the ability to substantially eliminate the fuel consumption aspect of carrying out hydrocarbon reforming operations. The technical and economic advantages of the invention thereby appreciably enhance the desirability by carrying to hydrocarbon reforming operations for practical commercial applications.

I claim:

1. An integrated, essentially autothermal, catalytic process for the primary and secondary reforming of fluid hydrocarbons comprising:
   (a) catalytically reacting a fluid hydrocarbon feed stream with steam in catalyst-containing reformer tubes positioned within a lower primary reforming zone of an integrated primary-secondary reformer, said primary reforming zone being maintained at an elevated temperature by the passage of hot product effluent from the secondary reforming zone of said reformer on the shell side of said primary reforming zone;
   (b) passing the partly reformed product effluent from said lower primary reforming zone upwardly in conduit means extending through the catalyst bed of the secondary reforming zone to the catalyst zone to the catalyst-free reaction space positioned in the secondary reforming zone above said catalyst bed;
   (c) introducing an oxygen-containing gas to said catalyst-free reaction space in the secondary reforming zone of said integrated reformer, exothermic reaction of said oxygen with unconverted fluid hydrogen feed and hydrogen causing the temperature of the reaction mixture in said reaction space to rise;
   (d) passing the reaction mixture from said reaction space to the secondary reforming catalyst bed, unconverted hydrocarbon feed present in said reaction mixture reacting with steam in an endothermic reaction during the passage of the reaction mixture through said catalyst bed so as to reduce the temperature of the reaction mixture from the temperature reached in said catalyst-free reaction space to a lower-elevated temperature;
   (e) introducing the secondary reforming product effluent gas passing from the discharge end of the secondary reforming catalyst bed to the shell side of the primary reforming zone to supply heat to maintain said elevated temperature for the endothermic steam reforming reaction taking place within the catalyst-filled reactor tubes of said primary reforming zone such that essentially all of the heat required in the primary reforming zone is supplied by the product effluent of the secondary reforming zone; and
   (f) discharging cooled effluent from the shell side of said primary reforming zone as the product effluent of said integrated primary-secondary reformer. whereby the desired overall primary and secondary reforming of the fluid hydrocarbon feed is accomplished without the need for an external fuel-fired primary reformer and/or for the burning of a portion of the hydrocarbon feed for fuel purposes.

2. The process of claim 1 in which the mole ratio of steam to hydrocarbon feed in the primary reforming zone is from about 2/1 to about 4/1, the temperature of the partly reformed product effluent from the primary reforming zone being from about 650° C. to about 900° C.

3. The process of claim 2 in which the oxygen-containing gas is preheated to from about 200° C. to about 600° C. prior to being into said catalyst-free reaction space of said secondary reforming zone, the exothermic reaction of oxygen with hydrocarbon feed causing the temperature in the reaction space to rise above about 930° C.

4. The process of claim 3 in which the temperature of the secondary reforming product effluent passing to the shell side of the primary reforming zone is from about 900° C. to about 1,000° C.

5. The process of claim 1 in which said hydrocarbon feed comprises methane.

6. The process of claim 5 in which the partly reformed product effluent of the primary reforming zone has an unconverted methane content of from about 3 t about 20 vol. % on a dry basis.

7. The process of claim 5 in which the oxygen-containing gas comprises air.

8. The process of claim 1 and including bypassing a portion of the hydrocarbon feed and steam to the secondary reforming zone of the integrated primary-secondary reformer.

9. The process of claim 8 in which said hydrocarbon feed and steam bypassed to the secondary reforming zone passes to the catalyst-free reaction space at the feed end of the catalyst bed in said zone.

10. The process of claim 9 in which said bypass stream has a mole ratio of steam to hydrocarbon feed of from about 0.4/1 to about 1.4/1.

11. The process of claim 10 in which said steam/hydrocarbon feed ratio is from about 0.5/1 to about 1/1.

12. The process of claim 10 in which about 50% to about 80% by volume of the hydrocarbon feed to the integrated reactor is bypassed to the secondary reforming zone therein.

13. The process of claim 2 in which the product effluent from said primary reforming zone is at a temperature of from about 700° C. to about 800° C.

14. The process of claim 9 in which said integrated reformer comprises a durable shell unit and including passing a coolant fluid through the annular space between the inner and outer shells.

15. The process of claim 14 in which said coolant is employed at essentially the reaction pressure within the integrated reactor.

16. The process of claim 15 in which said coolant comprises hydrocarbon feed gas.

17. The process of claim 1 in which said hydrocarbon feed comprises propane or butane.

18. The process of claim 1 in which said hydrocarbon feed comprises light naphtha.

19. The process of claim 1 and including bypassing a portion of the hydrocarbon feed and steam to an external, fuel-fired primary reforming unit, the product effluent from said external reformer being passed to the catalyst-free reaction space at the feed end of the catalyst bed in the secondary reforming zone of said integrated reactor.

20. The process of claim 19 in which from about 50% to about 80% by volume of the hydrocarbon feed to the integrated reformer by bypassed to said external fuel feed primary reforming unit.

* * * * *

UNITED STATES PATENT AND TRADEMARK OFFICE
CERTIFICATE OF CORRECTION

PATENT NO. : 4,822,521
DATED : April 18, 1989
INVENTOR(S) : Fuderer

It is certified that error appears in the above-identified patent and that said Letters Patent is hereby corrected as shown below:

In Column 13, line 48: Change "reformer." to --reformer,--.

Signed and Sealed this

Third Day of October, 1989

*Attest:*

DONALD J. QUIGG

*Attesting Officer*     *Commissioner of Patents and Trademarks*